(12) United States Patent
Park et al.

(10) Patent No.: US 9,600,118 B2
(45) Date of Patent: Mar. 21, 2017

(54) METHOD FOR PREVENTING TOUCH MISRECOGNITION, MACHINE-READABLE STORAGE MEDIUM, AND PORTABLE TERMINAL

(71) Applicant: Samsung Electronics Co., Ltd., Gyeonggi-do (KR)

(72) Inventors: Kyung-Wan Park, Gyeonggi-do (KR); Seok-Myong Kang, Gyeonggi-do (KR); Ho-Seong Seo, Gyeonggi-do (KR); Dae-Kwang Jung, Gyeonggi-do (KR); Ji-Hyun Jung, Gyeonggi-do (KR); Shi-Yun Cho, Gyeonggi-do (KR); Youn-Ho Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 100 days.

(21) Appl. No.: 13/772,845

(22) Filed: Feb. 21, 2013

(65) Prior Publication Data
US 2013/0215087 A1    Aug. 22, 2013

(30) Foreign Application Priority Data

Feb. 22, 2012  (KR) .................. 10-2012-0017829

(51) Int. Cl.
*G06F 3/041*  (2006.01)
*G06F 3/047*  (2006.01)

(52) U.S. Cl.
CPC ............ *G06F 3/0418* (2013.01); *G06F 3/047* (2013.01); *G06F 2203/04102* (2013.01)

(58) Field of Classification Search
CPC .................... G06F 3/0418; G06F 2203/04102
See application file for complete search history.

(56) References Cited

U.S. PATENT DOCUMENTS

| | | | |
|---|---|---|---|
| 2006/0274036 A1* | 12/2006 | Hioki et al. .................. | 345/156 |
| 2007/0242033 A1* | 10/2007 | Cradick et al. ............... | 345/156 |
| 2008/0284751 A1* | 11/2008 | Hsu ....................... | G06F 3/0488 345/173 |
| 2010/0117975 A1* | 5/2010 | Cho ...................... | G06F 1/1626 345/173 |
| 2010/0225578 A1* | 9/2010 | Ko ......................... | G06F 3/041 345/156 |
| 2011/0216016 A1* | 9/2011 | Rosener ................. | G06F 3/041 345/173 |
| 2011/0241907 A1* | 10/2011 | Cordeiro .............. | G06F 3/0418 341/20 |
| 2012/0062493 A1* | 3/2012 | Land .................... | G06F 3/0418 345/173 |
| 2013/0093692 A1* | 4/2013 | Wang et al. .................. | 345/173 |
| 2013/0169520 A1* | 7/2013 | Cho et al. .................... | 345/156 |

\* cited by examiner

*Primary Examiner* — Amr Awad
*Assistant Examiner* — Stephen Bray
(74) *Attorney, Agent, or Firm* — The Farrell Law Firm, P.C.

(57) ABSTRACT

A method for preventing a touch misrecognition includes counting a total number of touch detection values of a touch panel which is greater than or equal to a first threshold value; comparing the total number of touch detection values with a second threshold value; and when the total number of the touch detection values is greater than or equal to the second threshold value, determining that bending of the touch panel has occurred.

13 Claims, 5 Drawing Sheets

|   |   |   |   |   |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

FIG.6

|   |   |   |   |   |
|---|---|---|---|---|
| 10 | 2 | 4 | 3 | 0 |
| 1 | 1 | 3 | 4 | 1 |
| 5 | 6 | 0 | 19 | 2 |
| 0 | 3 | 4 | 8 | 3 |
| 0 | 4 | 6 | 7 | 4 |

FIG.7

|   |   |   |   |   |
|---|---|---|---|---|
| 10 | 2 | 4 | 3 | 0 |
| 1 | 1 | 3 | 4 | 1 |
| 5 | 56 | 0 | 19 | 2 |
| 0 | 3 | 4 | 8 | 3 |
| 0 | 4 | 6 | 7 | 4 |

FIG.8

|   |   |   |   |   |
|---|---|---|---|---|
| 0 | 0 | 0 | 0 | 0 |
| 0 | 0 | 0 | 0 | 0 |
| 0 | 50 | 0 | 0 | 0 |
| 0 | 0 | 0 | 0 | 0 |
| 0 | 0 | 0 | 0 |   |

FIG.9

|   |   |   |   |   |
|---|---|---|---|---|
| 10 | 2 | 4 | 3 | 0 |
| 1 | 1 | 3 | 4 | 1 |
| 65 | 56 | 70 | 57 | 77 |
| 0 | 3 | 4 | 8 | 3 |
| 0 | 4 | 6 | 7 | 4 |

FIG.10

|   |   |   |   |   |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

FIG.11

METHOD FOR PREVENTING TOUCH MISRECOGNITION, MACHINE-READABLE STORAGE MEDIUM, AND PORTABLE TERMINAL

PRIORITY

This application claims priority under 35 U.S.C. §119(a) to Korean Application Serial No. 10-2012-0017829, which was filed in the Korean Intellectual Property Office on Feb. 22, 2012, the entire content of which is hereby incorporated by reference.

BACKGROUND OF THE INVENTION

1. Field of the Invention

The present invention relates generally to a touch interface, and more particularly, to a method and an apparatus for preventing a touch misrecognition on the touch interface.

2. Description of the Related Art

In recent years, a flexible display, which is the next generation of display devices, has been spotlighted. In addition, a flexible device employing a flexible display and an input unit that can be applied to the flexible device are being studied.

Touch panels that are representative input units according to the related art largely include capacitive touch panels and resistive touch panels.

Capacitive touch panels employ an Indium Tin Oxide (ITO) pattern having a small thickness to maintain transparency. Such an ITO material is susceptible to being broken due to repeated folding and bending, and accordingly, it is difficult to use the capacitive touch panel as an input unit of a flexible device.

Resistive touch panels require and need to maintain an air gap between electrodes for insulation. However, if a resistive touch panel is folded or bent, an air gap cannot be maintained, so the resistive touch film is vulnerable to damage due to repeated folding or bending.

Since the touch panel according to the related art cannot be properly applied to a flexible device, a touch panel that can be used as an input unit of a flexible device, and a method for detecting a bent region and preventing a touch misrecognition, are required.

SUMMARY OF THE INVENTION

The present invention has been made to address at least the problems and disadvantages described above, and to provide at least the advantages described below. Accordingly, an aspect of embodiments of the present invention is to at least partially solve, mitigate, or remove the problems and/or shortcomings of the related art.

In accordance with an aspect of the present invention, there is provided a method for preventing a touch misrecognition, the method including counting a total number of touch detection values of a touch panel which is greater than or equal to a first threshold value; comparing the total number of touch detection values with a second threshold value; and when the total number of the touch detection values is greater than or equal to the second threshold value, determining that bending of the touch panel has occurred.

In accordance with another aspect of the present invention, there is provided a flexible portable terminal including a display unit for displaying an image; a touch panel for outputting touch detection values; and a control unit for counting a total number of touch detection values of a touch panel which is greater than or equal to a first threshold value, comparing the total number of the touch detection values with a second threshold value, and when the total number of the touch detection values is greater than or equal to the second threshold value, determining that bending of the touch panel has occurred.

BRIEF DESCRIPTION OF THE DRAWINGS

The above and other aspects, features, and advantages of the present invention will be more apparent from the following detailed description taken in conjunction with the accompanying drawings, in which:

FIGS. 6 to 11 are views explaining the method for preventing a touch misrecognition.

DETAILED DESCRIPTION OF EMBODIMENTS OF THE PRESENT INVENTION

The present invention may be variously modified and may include various embodiments, and embodiments of the present invention will be described with reference to the accompanying drawings. However, it is noted that the embodiments are not intended to limit the present invention to specific forms, but various modifications, equivalents, and replacements included in the spirit and technical scope of the present invention fall within the scope of the present invention.

The terms including ordinal numbers such as first and second may be used in describing various constituent elements, but the constituent elements are not limited by these terms. The terms are used only to distinguish one constituent element from other constituent elements. For example, a second constituent element may be named a first constituent element and a first constituent element may be named a second constituent element in a similar way without departing from the scope of the present invention. The term 'and/or' includes a combination of a plurality of related items or any item of the plurality of related items.

The terms used herein are used only to describe specific embodiments, but are not intended to limit the present invention. A singular expression includes a plural expression unless it is clearly construed in a different way in that context. The terms used herein, such as "including" or "having" are used only to designate the features, number, steps, operations, constituent elements, parts, or combinations thereof described in the specification, but should not be construed to exclude the existence or addition of one or more other features, numbers, steps, operations, constituent elements, parts, or combinations thereof.

All of the terminologies containing one or more technical or scientific terminologies have the same meanings that persons skilled in the art understand ordinarily unless they are defined otherwise. A term ordinarily used like that defined by a dictionary shall be construed that it has a meaning equivalent to that in the context of a related description, and shall not be construed in an ideal or excessively formal meaning unless it is clearly defined in the present specification.

Figure 1:
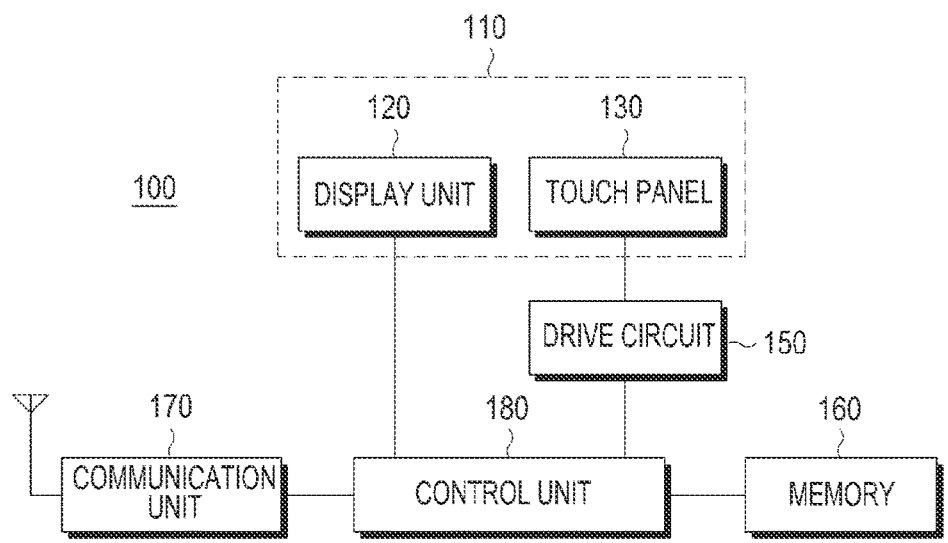
FIG. 1 is a block diagram schematically illustrating a portable terminal according to an embodiment of the present invention.

FIG. 1 is a block diagram schematically illustrating a portable terminal according to an embodiment of the present invention.

The portable terminal 100 includes a touch interface 110 having a display unit 120 and a touch panel 130, a drive circuit 150, a memory 160, a communication unit 170, and a control unit 180. The touch interface 110 also may be referred to as a touch screen. In addition to the constituent devices, the portable terminal 100 may further include a speaker for outputting a sound, a microphone for inputting a sound, and a camera module for photographing an image. The portable terminal 100 may be any one of a general camera having a flexible touch interface, a camcorder, and a portable communication terminal, such as for example, a mobile phone, a console, a Personal Digital Assistant (PDA), a tablet PC, or the like.

The touch interface 110 includes a window of a synthetic resin such as polyethylene terephthalate (PET) or a plastic material, display unit 120 protected by the window, and touch panel 130, and has a flexibility by which the touch interface 110 is easily deflected by a user, and a resiliency by which the touch interface 110 is returned to its original shape after being deflected.

The display unit 120 displays an image, and may include a Liquid Crystal Display (LCD), an Organic Light Emitting Diode (OLED), and an LED. The window may be included in the display unit 120.

The touch panel 130 is disposed below or above the display unit 120. For example, a user may touch various executable items displayed on a screen of the touch interface 110 (that is, a surface of the touch interface 110) to implement applications or link pages related to the items. In the example, the display unit 120 is disposed on a front surface of the portable terminal 100, and the touch panel 130 is disposed below the display unit 120. When the touch panel 130 is transparent, the touch panel may be disposed on a front surface of the portable terminal 100.

The touch panel 130 is a resistive type touch panel, and detects a user input. If a user input unit (for example, a finger and a stylus pen) pushes a surface of the touch interface 110, the touch panel 130 outputs a detection signal (or a touch detection signal) having information on an input location (or coordinate) and/or an input pressure.

The drive circuit 150 drives the touch panel 130 under the control of the control unit 180, and outputs user input information including an input location and/or an input pressure recognized from a detection signal output from the touch panel 130 to the control unit 180. The drive unit 150 may be included in the control unit 180 or the touch panel 130, and may convert an analog detection signal input from the touch panel 130 to a digital detection signal and output the digital detection signal to the control unit 180.

Figure 2:
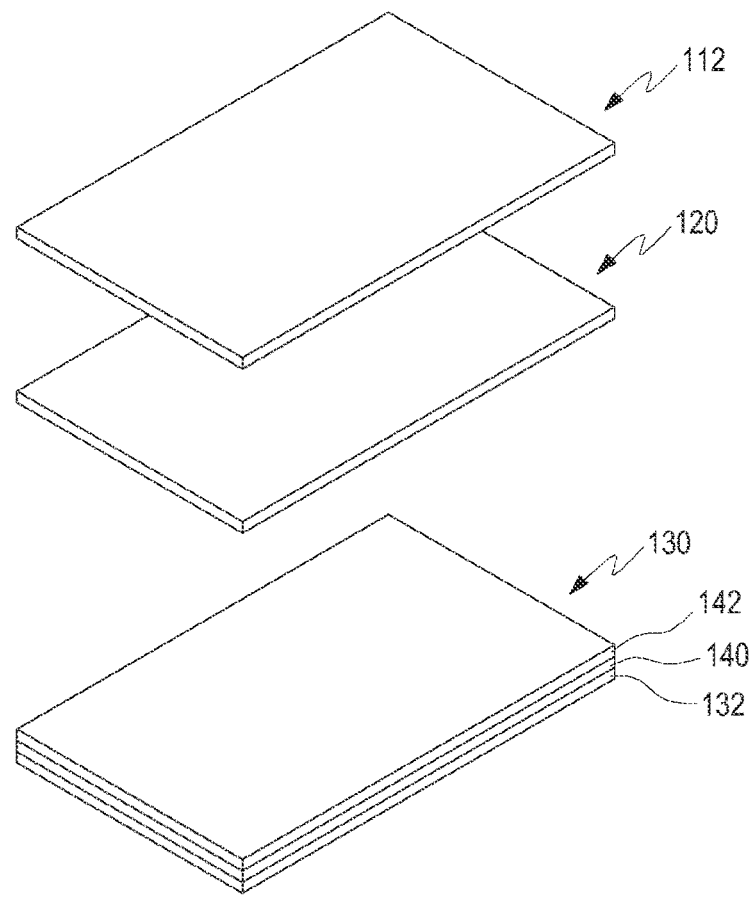
FIG. 2 is an exploded perspective view illustrating a touch interface.

FIG. 2 is an exploded perspective view illustrating the touch interface 110. As illustrated, the touch interface is configured such that the touch panel 130, the display unit 120, and the window 112 are sequentially stacked from bottom to top while being attached to each other or partially or entirely spaced apart from each other. The touch panel 130, the display unit 120, and the window 112 have flexibility and resiliency.

The touch panel 130 includes a sensor layer 140 for recognizing an input location and/or an input pressure of the user input unit, and first and second substrates 132 and 142 are stacked on a bottom surface and a top surface, respectively, of the sensor layer 140 to support the sensor layer 140.

The sensor layer 140 has a pattern for recognizing an input location and/or an input pressure of the user input unit, and may have various patterns that include, for example, a linear lattice pattern, and a diamond pattern. Hereinafter, a case of the sensor layer 140 having a linear lattice pattern will be described.

Figure 3:
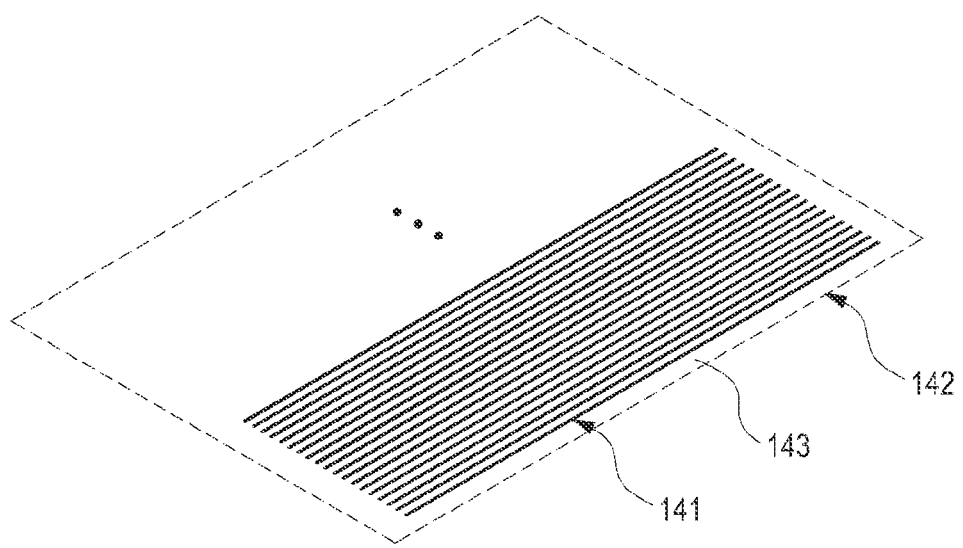
FIG. 3 is a diagram illustrating first and second sensor lines of sensor layers.
Figure 3:
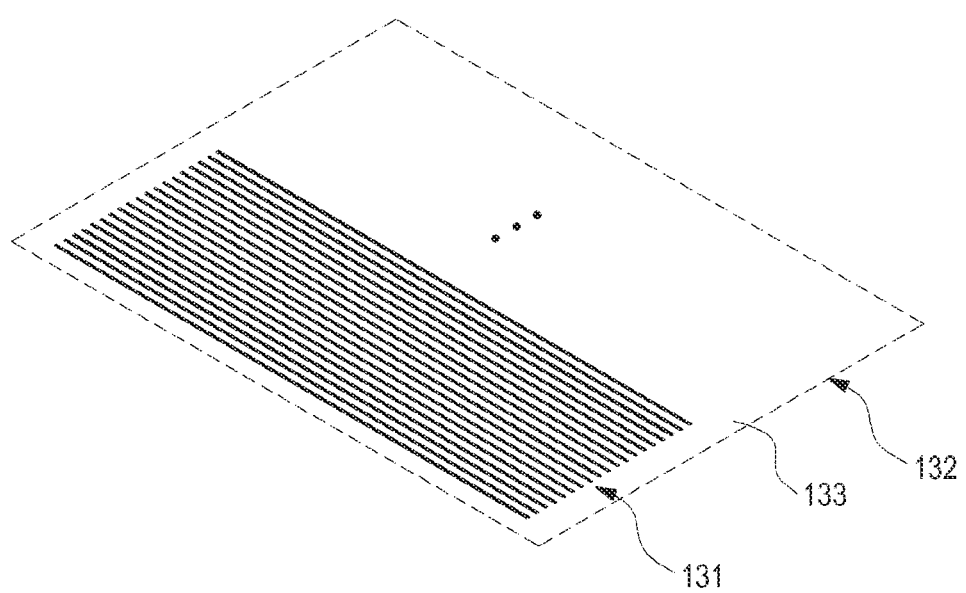

FIG. 3 is a diagram illustrating first and second sensor lines of the sensor layer. The first sensor lines 131 are stacked on a top surface 133 of first substrate 132, the second sensor lines 141 are stacked on a bottom surface 143 of second substrate 142, and the top surface 133 of the first substrate 132 and the bottom surface 143 of the second substrate 142 face each other.

The first sensor lines 131 extend along a first direction (for example, the Y axis or vertical direction), or are disposed at an equal interval or different intervals along a second direction (for example, the X axis or horizontal axis) crossing the first direction perpendicularly. The second sensor lines 141 extend along the second direction crossing the first direction perpendicularly, and are disposed at an equal interval or different intervals along the first direction.

Figure 4:
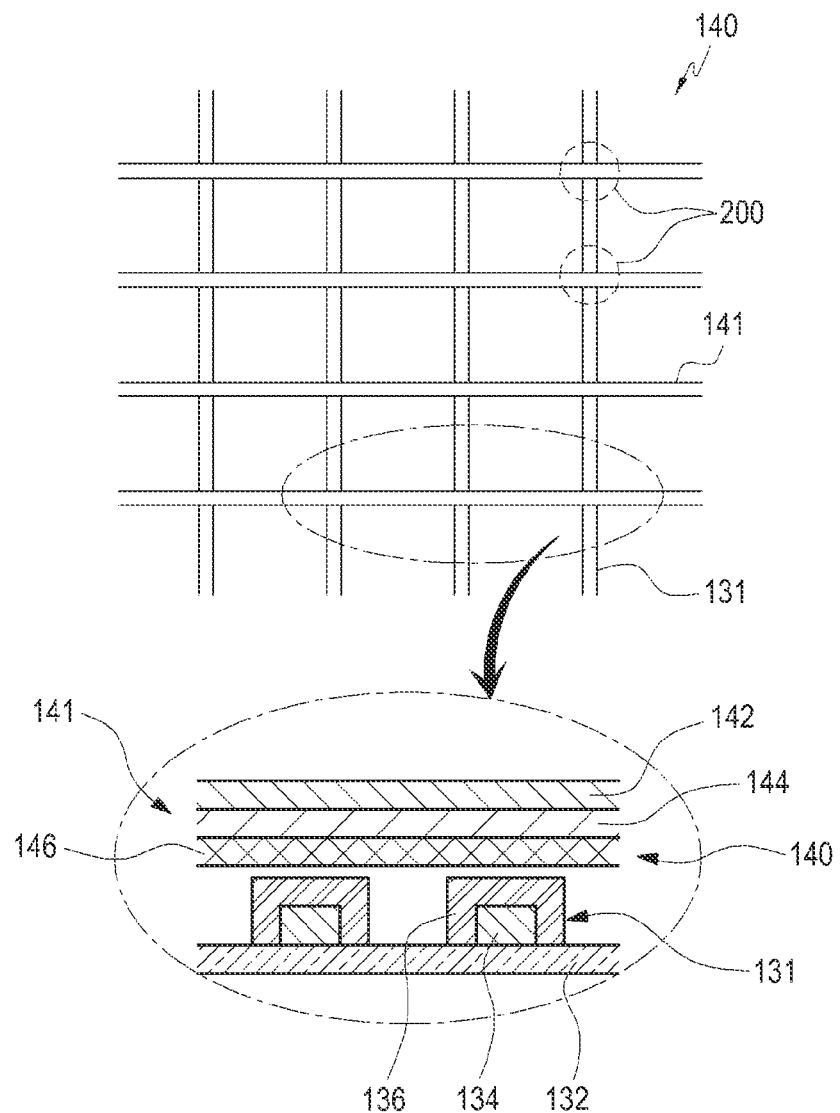
FIG. 4 is a diagram explaining a principle of a sensor layer detecting a user input.

FIG. 4 is a diagram explaining a principle of a sensor layer detecting a user input. The first sensor line 131 stacked on a top surface of the first substrate 132 includes a first electrode line 134 directly stacked on a top surface of the first substrate 132, and a first resistance layer 136 stacked to surround an exposed outer peripheral surface of the first electrode line 134. The second sensor line 141 stacked on a bottom surface of the second substrate 142 includes a second electrode line 144 stacked on a bottom surface of the second substrate 142, and a second resistance layer 146 stacked to surround an exposed outer peripheral surface of the second electrode line 144. The first and second substrates 132 and 142 may be formed of a synthetic resin such as a polyimide or a plastic material, and the first and second electrode lines 134 and 144 may be formed of a metallic material such as silver. The first and second resistance layers 136 and 146 may be formed of a resistant material such as carbon, and the first and second resistance layers 136 and 146 may be separated from each other or contact each other, and may have rough surfaces, respectively.

In order to implement a sensor function, preset wave voltages (that is, scan signals) are sequentially applied to the second electrode lines 144, and the first electrode lines 134 output detection signals based on the scan signals. If the user input unit pushes the touch panel 130, a resistance of a contact portion of the first and second resistance layers 136 and 146 varies while a contact area of the first and second resistance layers 136 and 146 varies. Due to the variations in resistance, voltage waves of the detection signals output from the first electrode lines 134 vary, and an input location and/or an input pressure of the user input unit is recognized from the detection signals whose voltage waves have changed. The points where the first and second sensor lines 131 and 141 cross each other form sensing points 200, and the sensing points 200 are disposed in a matrix structure in this example. That is, the user input location is determined to be one of the locations of the sensing points 200 or an intermediate location of the sensing points 200.

In this example, although it is exemplified that the control unit 180 includes an application processor operated in conjunction with the touch panel 130 and a main processor for controlling an overall operation of the portable terminal 100, the application processor may be separately provided.

Further, the drive circuit 150 may include an analog/digital converter (ADC), a digital/analog converter (DAC), a general purpose input/output (GPIO), a microcontroller, and a memory. Further, although it is shown that the control unit 180 and the drive circuit 150 are separately provided, the drive circuit 150 may be included in the control unit 180.

Referring back to FIG. 1, the memory 160 stores an operating system of the portable communication terminal 100, various applications, information input to the portable terminal 100, and information created therein.

The communication unit 170 may be a wired or wireless communication unit, and transmits data from the control unit 180 by wire or wirelessly, or receives data from an external communication line or the air by wire or wirelessly to transfer the received data to the control unit 180.

The control unit 180 is a central processing unit, and controls an overall operation of the portable terminal 100. Further, when the touch interface 110 is bent, the control unit 180 performs a process for preventing a touch misrecognition that may occur due to the bending. Such a process may be applied to prevent a touch misrecognition due to circuit noise in the touch interface 110.

If a simulation showing stress distribution in the touch interface 110 when the touch interface 110 is bent is executed, it can be seen that when the touch screen interface 110 is folded into half by a folding mechanism, a strong stress is concentrated at a central portion of the touch interface 110.

In most of examples utilizing a flexible touch interface, locations or the part where the touch interface 110 is folded are constant. Hereinafter, as an example of a method for preventing a touch misrecognition due to bending according to the present invention, a method for periodically or non-periodically monitoring a reference row located in the middle of a matrix of the entire sensing points 200 of the touch panel 130, and correcting output values of the entire sensing points 200 according to the monitoring result is disclosed. The reference row corresponds to a preset bending location of the touch interface 130. The method performed for the sensing points of the following reference row may then be applied to a plurality of reference rows.

Figure 5:
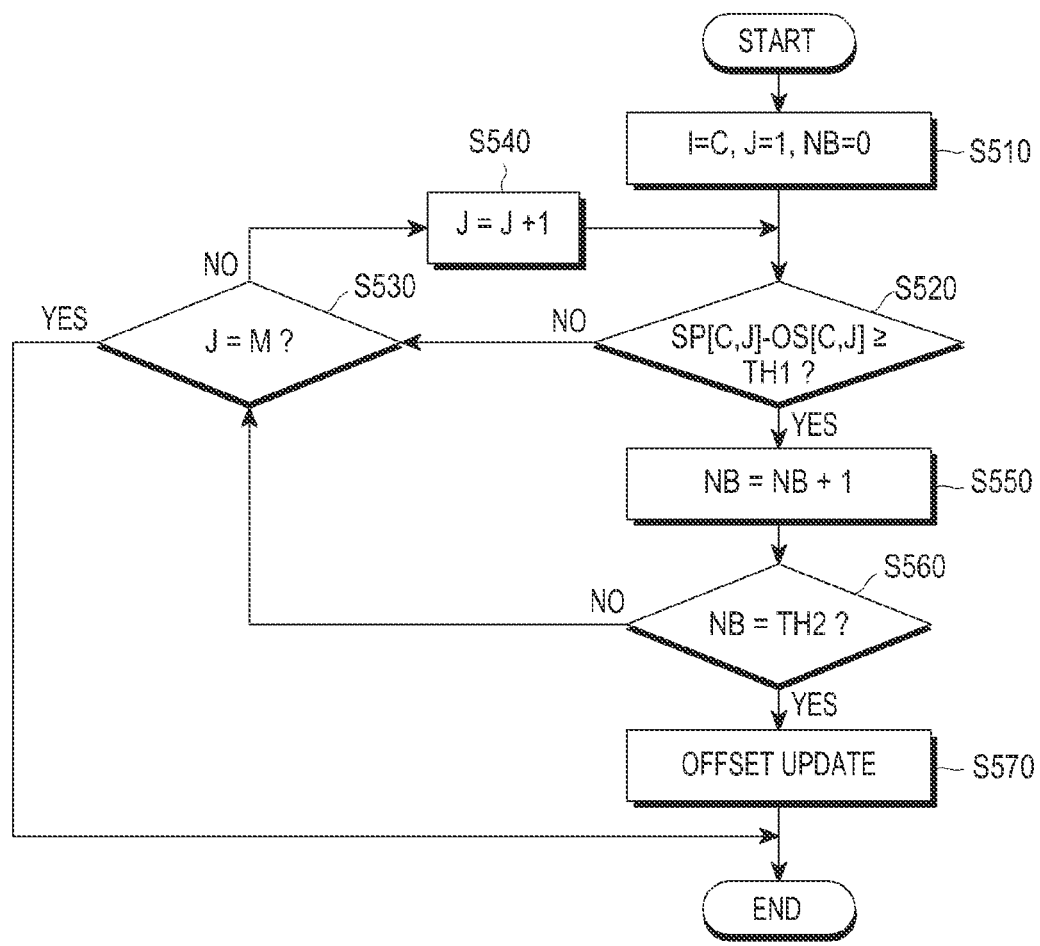
FIG. 5 is a flowchart illustrating a method for preventing a touch misrecognition due to bending according to an embodiment of the present invention.

FIG. 5 is a flowchart illustrating a method for preventing a touch misrecognition due to a bending according to an embodiment of the present invention, and FIGS. 6 to 11 are views explaining the method for preventing a touch misrecognition. The method may be implemented by the control unit 180 using the drive circuit 150, or may be implemented by the drive circuit 150 itself, and will be described below with the control unit 180 acting as a subject.

Step S510 is an initialization step, in which parameters used in the method, that is, a row number I, a column number J, and the number NB of offsets applied objects (hereinafter, referred to as the number of offsets) are initialized to the numbers C, 1, and 0 of the intermediate rows of the entire sensing points 200. In this example, although a reference row to be monitored is set to be an intermediate row of the entire sensing points 200, the reference row to be monitored may be set to be an arbitrary row of the entire sensing points 200. In addition, only some of the sensing points 200 in the reference row may be monitored. Further, a plurality of reference rows may be used, in which case step S520 to S560 may be repeated while the row number is changed. Although a row is monitored in this example, a column may be monitored or a plurality of reference columns may be used. Moreover, steps S520 to S560 may be repeated while the row number and the column number are changed for the sensing points in a predetermined range (for example, an intermediate part of the entire sensing points 200).

In step S520, the control unit 180 compares output values SP[C,J] of each sensing point 200 of a reference row with previous offset values OS[C,J] given to the sensing point 200, and determines whether the difference is greater than or equal to a first threshold value TH1. If the difference is greater than or equal to the first threshold value, step S550 is performed, and if the difference is less than the first threshold value TH1, step S530 is performed. In this example, although the difference from an offset value is a comparison object, an output value of the sensing point 200 may be a comparison object. That is, an output value of the sensing point 200 may be compared with another threshold. The first threshold value TH1 may be set to be larger than an average pressure by a user touch so that a pressure due to bending can be distinguished.

The values (that is, forces or pressures) output from the entire sensing points 200 (hereinafter, also referred to as detection values or touch detection values) are periodically stored in the memory 160, and offset values of the previous period for correcting an output error of the sensing points 200 are also stored in the memory 160. The offset values remain the offset values of the previous period until they are updated. The difference may be detection values corrected by the previous offset value.

FIGS. 6 to 11 show that the entire sensing points have a 5 by 5 matrix structure.

Referring to FIG. 6, when no force is applied to the touch panel 130 and there is no circuit noise in the touch panel 130, all the detection values of the entire sensing points 200 are zero.

Referring to FIG. 7, when there is circuit noise in the touch panel 130, the detection values of the entire sensing points 200 represent error values of a predetermined pattern even when there is neither user input nor bending.

Referring to FIG. 8, if a user input unit applies a pressure to a sensing point at row 3 and column 2 while error values are not yet corrected, the sensing point at row 3 and column 2 outputs a detection value obtained by adding a pressure value (that is, 50) by a user input and an error value (that is, 6).

Referring to FIG. 9, all the detection values initially corrected as offset values are applied to the original detection values of the entire sensing points 200 have a value of zero. If the user input unit applies a pressure to a sensing point at row 3 and column 2 while the error values are corrected, the sensing point at row 3 and column 2 outputs a finally corrected detection value (that is, 50) representing only a pressure value (that is, 50) by the user input.

Referring back to FIG. 5, a previous offset value compared in step S520 corresponds to an offset value of the previous period.

In step S530, the control unit 180 compares the column number J with the number N (that is, 5) of all the rows, and if J is equal to M, the method is completed, and if J is not equal to M, step S540 is performed.

In step S540, the control unit 180 increases the column number J by one, and performs step S520.

In step S550, the control unit 180 increases the number NB of offsets by one, and performs step S560.

In step S560, the control unit 180 compares the number NB of offsets with a second threshold TH2, and if NB is equal to TH2, step S570 is performed, and if NB is not equal to TH2, step S530 is performed. That is, when NB is equal to TH2, the control unit 180 determines that the reference row has a bending error.

In step S570, the control unit 180 substitutes detection values for all of the sensing points 200 for offset values to update the offset values. That is, the control unit 180 performs an operation of OS[I,J]=SP[I,J] for I=1 to M and J=1 to N.

Hereinafter, a case of TH1=60, TH2=3, and C=3 will be discussed.

Referring to FIG. 10, the control unit 180 recognizes that detection values (that is, 65, 70 and 77) of column 1, column 3 and column 5 among detection values of row 3 is greater than or equal to a first threshold value, and accordingly determines that bending has occurred. The control unit 180 substitutes detection values of the entire sensing points 200 for offset values to update the offset values. That is, the control unit 180 performs an operation of OS[I,J]=SP[I,J] for I=1 to 5, J=1 to 5.

Referring to FIG. 11, it can be seen that all of the initially corrected detection values of the entire sensing points 200 represent zero according to the update of the offset.

In this example, although it is shown that a reference value which is a correction target of the detection value is zero, the reference value may be set to an arbitrary value other than zero.

Further, in this example, although it is shown that the offset values are updated by substituting the detection values of the entire sensing points for offset values, the update of the offset may be performed only for some of the entire rows, for example, rows having bending errors.

In this example, although it is shown that only a resistive type touch panel is used, a capacitive touch panel may be disposed between the window 112 and the display unit 120. In this case, the offset values may be used to correct detection values of the capacitive touch panel.

The present invention can detect that bending or folding has occurred in an input unit of a flexible device to inform a user of a state of the terminal Further, the present invention compensates for a pressure value due to bending or folding to compensate for a touch misrecognition or help recognize a touch even in a bending or folding state.

While it is shown that an offset is updated if bending occurs, examples of preventing a touch misrecognition include neglecting touch detection values of rows having bending errors, informing a user that bending simply occurs, and determining that bending other than a user input has occurred.

It can be seen that the embodiments of the present invention may be realized in the form of hardware, software, or a combination of hardware and software. For example, regardless of the possibility of the software being deleted or rerecorded, the software may be stored in a volatile or non-volatile storage unit such as an ROM, a memory such as a RAM, a memory chip, a unit or an integrated circuit, or an optically or magnetically recordable and machine (for example, computer-readable storage medium such as a CD, a DVD, a magnetic disk or a magnetic tape. The memory which can be included in a portable terminal is an example of a storage medium of a program including instructions for realizing the embodiments of the present invention or a storage medium which can be read by a machine suitable for storing the programs. Thus, the present invention includes a unit described in any claim, a program including a code for realizing the method, and a storage medium which can be read by a machine for storing a program. Further, the program may be electrically transferred through any medium such as a communication signal transferred through a wired or wireless connection, and the present invention properly includes their equivalents.

Further, the portable terminal of the present invention may receive the program in a wired or wireless manner from a program providing unit. The program providing unit includes a program including instructions for allowing the portable terminal to perform a method for preventing a misrecognition of a touch screen, a memory for storing update information of the program, a communication unit for performing a wired or wireless communication with the portable terminal, and a control unit for transmitting the program to the imaging device upon a request of the portable terminal or automatically.

Although the present invention has been described with reference to certain embodiments thereof, various modifications may be made without departing from the scope of the present invention. Thus, the scope of the present invention is not determined by the embodiments but by the claims and their equivalents.

What is claimed is:

1. A method for detecting bending in a touch panel, the method comprising:
    counting a total number of sensing points having differences which are greater than or equal to a first threshold value by comparing a difference between a measured detection value of each sensing point and an offset value for each sensing point to the first threshold value;
    comparing the total number of the sensing points with a second threshold value;
    when the total number of the compared sensing points is greater than or equal to the second threshold value, determining that bending of the touch panel has occurred; and
    when determining that the bending of the touch panel has occurred, updating offset values for the sensing points of the touch panel by setting each offset value based on a corresponding measured detection value.

2. The method of claim 1, wherein a plurality of sensing points of the touch panel are disposed in a matrix structure, and the detection values are created by the sensing points arranged in a preset row among the plurality of sensing points.

3. The method of claim 2, wherein the detection values are pressure values representing a touch.

4. The method of claim 1, wherein the first threshold value is greater than a touch threshold for identifying a touch.

5. The method of claim 1, wherein previous offset values applied to previous detection values of the sensing points are different from each other.

6. A non-transitory machine-readable storage medium for recording a program for executing a method of detecting bending in a touch panel, the method comprising:
    counting a total number of sensing points having differences which are greater than or equal to a first threshold value by comparing a difference between a measured detection value of each sensing point and an offset value for each sensing point to the first threshold value;
    comparing the total number of the sensing points with a second threshold value;
    when the total number of the compared sensing points is greater than or equal to the second threshold value, determining that bending of the touch panel has occurred; and
    when determining that the bending of the touch panel has occurred, updating offset values for the sensing points of the touch panel by setting each offset value based on a corresponding measured detection value.

7. The non-transitory machine-readable storage medium of claim 6, wherein the first threshold value is greater than a touch threshold for identifying a touch.

8. The non-transitory machine-readable storage medium of claim 6, wherein previous offset values applied to previous detection values of the sensing points are different from each other.

9. A flexible portable terminal comprising:
a display unit configured for displaying an image;
a touch panel configured for outputting detection values; and
a control unit configured for:
counting a total number of sensing points having differences which are greater than or equal to a first threshold value by comparing a difference between a measured detection value of each sensing point and an offset value for each sensing point to the first threshold value;
comparing the total number of the sensing points with a second threshold value;
when the total number of the compared sensing points is greater than or equal to the second threshold value, determining that bending of the touch panel has occurred; and
when determining that the bending of the touch panel has occurred, updating offset values for the sensing points of the touch panel by setting each offset value based on a corresponding measured detection value.

10. The flexible portable terminal of claim 9, wherein a plurality of sensing points of the touch panel are disposed in a matrix structure, and the detection values are created by the sensing points arranged in a preset row among the plurality of sensing points.

11. The flexible portable terminal of claim 10, wherein the detection values are pressure values representing a touch.

12. The flexible portable terminal of claim 9, wherein the first threshold value is greater than a touch threshold for identifying a touch.

13. The flexible portable terminal of claim 9, wherein previous offset values applied to previous detection values of the sensing points are different from each other.

* * * * *